C. KING.
Churn.
No. 4,449.  Patented April 4, 1846.
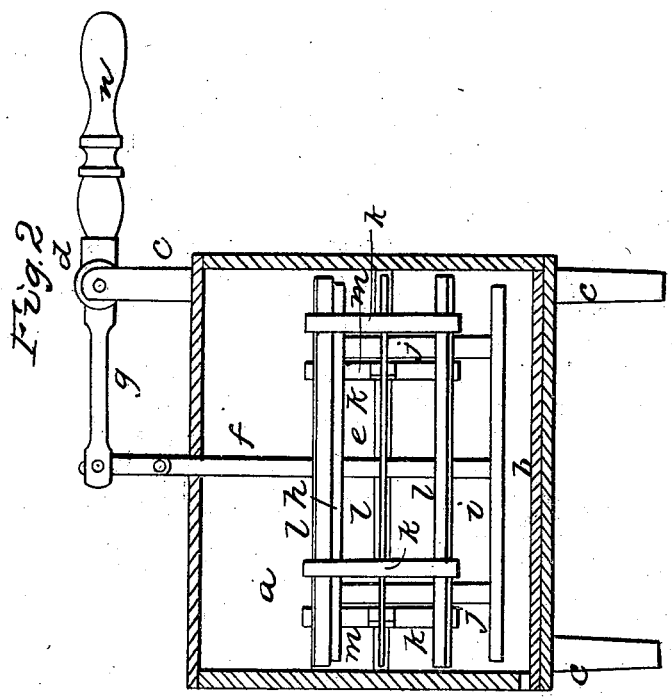
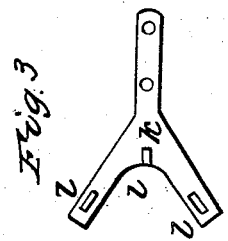
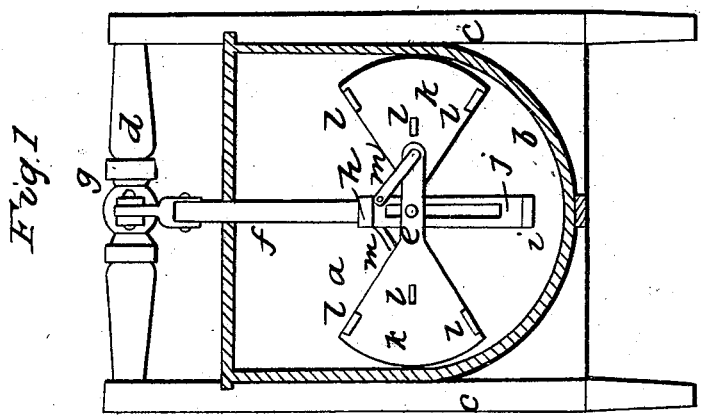

UNITED STATES PATENT OFFICE.

CHARLES KING, OF SCIPIO, NEW YORK.

CHURN-DASHER.

Specification of Letters Patent No. 4,449, dated April 4, 1846.

*To all whom it may concern:*

Be it known that I, CHARLES KING, of Scipio, in the county of Cayuga and State of New York, have invented a new and useful Machine for Churning Butter; and I do hereby declare that the following is a full, clear, and exact description of the construction and operation of the same, reference being had to the annexed drawings, making a part of this specification, in which—

Figure 1 is a vertical transverse section, Fig. 2 a vertical longitudinal section, and Fig. 3 one of the oscillating dashers of a varied shape.

The churn proper consists of an oblong box $a$ with a semicircular bottom or bed-piece $b$, and is supported by four legs $c$, two of which at one end of the box extend or rise somewhat above it, where they are connected by a cross-piece $d$. A shaft $e$, passing through the two head-pieces of the box, extends lengthwise in it, and supports the beaters hereafter described. The center of the circle of the bed-piece $b$ is the place of said shaft. From the middle of the cross-piece $d$, which on gudgeons on its ends moves in the tops of the aforesaid extensions of the two legs, extends an arm $g$, in a horizontal direction, toward the center of the churn. To its extremity is attached another arm $f$, at a right angle with the former, tending downward and serving as a pitman to the next described gate or vertical dasher to the middle of which it is attached. This dasher consists of a horizontal top and bottom piece $h$ and $i$, connected near their ends by vertical posts $j$, which are furnished with a slot each, which extends nearly their whole length, so as to embrace the shaft $e$, which serves them as a guide, to move steadily up and down. There are two other dashers composed of two headpieces $k$ each, and a number of slats $l$.

The head-pieces (as shown in drawing) are made of a triangular shape, one side of which is segmental, and the opposite angle has a short extension with a hole or perforation on which the said dashers are hung to the shaft $e$. These last named extensions are connected with the respective extremities of the top rail $h$ of the vertical dasher, by means of short slats $m$ operating similar to cranks. The head-pieces $k$ of the oscillating dashers need not be of one entire piece, but may be made with two arms as shown in Fig. 3, so as to produce what may be called twin-dashers. The machine is worked by hand by means of a handle $n$ fastened to the crosspiece $d$, opposite to the abovenamed arm $e$ and in a line therewith.

The handle $n$ being depressed, the opposite end of the arm or lever $g$ rises, and consequently raises the vertical dasher. In consequence of the inner extremities of the oscillating dashers being attached to the top-rail of the vertical dasher, the outer extremities of said dashers perform a segmental motion downward, and vice versa when the handle $n$ is raised. Thus a combination of a variety of motions in the dashers of the churn is produced, by which the butter is easily and expeditiously separated from the milk, and, at the same time, the labor in the process of churning is lessened.

What I claim as my invention, and desire to secure by Letters-Patent, is—

The combination of the vertical dasher with the oscillating dashers, constructed and operating in the manner and for the purpose hereinabove set forth.

CHARLES KING.

Witnesses:
FRANCIS BENNES,
T. C. DOWN.